US008159966B1

(12) United States Patent
Mabee et al.

(10) Patent No.: US 8,159,966 B1
(45) Date of Patent: Apr. 17, 2012

(54) PACKET PROCESSING PROFILE SELECTION AND DELIVERY IN WIRELESS COMMUNICATION SYSTEMS

(75) Inventors: Kent DeLancy Mabee, San Diego, CA (US); Randall Allen Smischny, Overland Park, KS (US); Jeremy R. Breau, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 667 days.

(21) Appl. No.: 12/277,011

(22) Filed: Nov. 24, 2008

(51) Int. Cl.
*H04L 12/26* (2006.01)
*H04L 12/28* (2006.01)
*H04L 12/56* (2006.01)
*G06F 15/16* (2006.01)

(52) U.S. Cl. ...... 370/252; 370/389; 370/395.2; 709/228; 709/229

(58) Field of Classification Search .......... 370/310–350, 370/395.2, 252; 709/218, 225, 227, 258, 709/229
See application file for complete search history.

(56) References Cited

U.S. PATENT DOCUMENTS

| | | | | |
|---|---|---|---|---|
| 6,801,528 B2 * | 10/2004 | Nassar | | 370/389 |
| 6,891,842 B2 * | 5/2005 | Sahaya et al. | | 370/401 |
| 7,684,432 B2 * | 3/2010 | Adamczyk et al. | | 370/463 |
| 8,051,472 B2 * | 11/2011 | Maes | | 726/8 |
| 2002/0154643 A1 * | 10/2002 | Satomi et al. | | 370/401 |
| 2003/0174647 A1 | 9/2003 | Gutierrez et al. | | |
| 2004/0032844 A1 * | 2/2004 | Lewis et al. | | 370/338 |
| 2005/0152395 A1 * | 7/2005 | Hales | | 370/465 |
| 2007/0002765 A1 * | 1/2007 | Kadaba et al. | | 370/254 |
| 2007/0153687 A1 | 7/2007 | Attar et al. | | |
| 2007/0245007 A1 * | 10/2007 | Tsirtsis et al. | | 709/223 |
| 2007/0276957 A1 | 11/2007 | King et al. | | |
| 2008/0077502 A1 * | 3/2008 | Boyd | | 705/14 |
| 2008/0316923 A1 * | 12/2008 | Fedders et al. | | 370/230 |
| 2009/0003264 A1 * | 1/2009 | Sastry | | 370/328 |
| 2010/0105401 A1 | 4/2010 | Chun et al. | | |
| 2010/0309784 A1 * | 12/2010 | Mihaly et al. | | 370/230 |

OTHER PUBLICATIONS

USPTO Office Action Summary from U.S. Appl. No. 12/365,187 mailed Jan. 24, 2011.

* cited by examiner

*Primary Examiner* — Warner Wong

(57) ABSTRACT

What is disclosed is a method of operating a communication system which includes a plurality of packet processing systems that each comprises one of a plurality of packet payload inspection systems. The method includes receiving a registration request from a wireless communication device, and in response, selecting one of the packet processing systems for the wireless communication device, obtaining a user profile for the wireless communication device, and obtaining a location for the wireless communication device. The method also includes transferring data indicating the wireless communication device, the user profile for the wireless communication device, and the location for the wireless communication device for delivery to the one of the packet payload inspection systems included in the selected one of the packet processing systems. The method also includes receiving the data in the one of the packet payload inspection systems, and in response, inspecting packet payloads associated with the wireless communication device based on the data.

10 Claims, 4 Drawing Sheets

PACKET PROCESSING PROFILE SELECTION AND DELIVERY IN WIRELESS COMMUNICATION SYSTEMS

TECHNICAL FIELD

Aspects of the disclosure are related to the field of communications, and in particular, packet processing profile selection and delivery for wireless communication networks.

TECHNICAL BACKGROUND

Wireless communication networks typically include equipment and systems for handling wireless communications of wireless communication devices. The wireless communications between the wireless communication devices and the wireless communication network can be monitored and processed on a packet-by-packet basis to enforce various service level agreements or quality-of-service policies for the wireless communication devices, as well as report usage information to monitoring equipment in the wireless communication network.

Unfortunately, as the wireless communication devices move between different access locations on a wireless communication network that spans a large geographic region, it becomes a challenge to correlate the wireless communication devices to packet-based service level agreements or quality-of-service policies of localized packet processing systems. Additionally, coordination and exchange of the data required by localized packet processing systems across a regional or national wireless communication network leads to a prohibitively large quantity of interconnection and overhead communication links.

OVERVIEW

What is disclosed is a method of operating a communication system which includes a plurality of packet processing systems that each comprises one of a plurality of packet payload inspection systems. The method includes receiving a registration request from a wireless communication device, and in response, selecting one of the packet processing systems for the wireless communication device, obtaining a user profile for the wireless communication device, and obtaining a location for the wireless communication device. The method also includes transferring data indicating the wireless communication device, the user profile for the wireless communication device, and the location for the wireless communication device for delivery to the one of the packet payload inspection systems included in the selected one of the packet processing systems. The method also includes receiving the data in the one of the packet payload inspection systems, and in response, inspecting packet payloads associated with the wireless communication device based on the data.

What is also disclosed is a communication system. The communication system includes a wireless communication system comprising a plurality of packet processing systems, where each of the plurality of packet processing systems comprises one of a plurality of packet payload inspection systems. The wireless communication system is configured to receive a registration request from a wireless communication device, and in response, select one of the plurality of packet processing systems for the wireless communication device, obtain a user profile for the wireless communication device, and obtain a location for the wireless communication device. The wireless communication system is also configured to transfer data indicating the wireless communication device, the user profile for the wireless communication device, and the location for the wireless communication device for delivery to the one of the packet payload inspection systems included in the selected one of the packet processing systems. The one of the packet payload inspection systems is configured to receive the data, and in response, inspect packet payloads associated with the wireless communication device based on the data.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
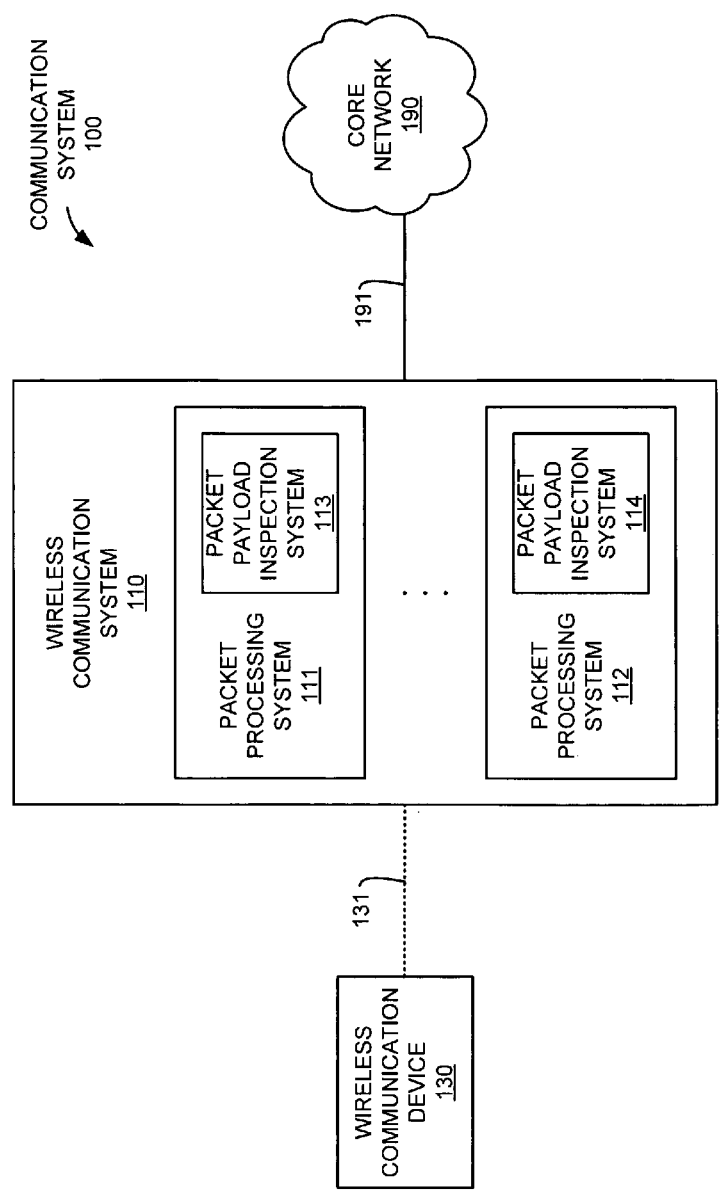
FIG. 1 is a system diagram illustrating a communication system.

FIG. 1 is a system diagram illustrating communication system 100. Communication system 100 includes wireless communication system 110, wireless communication device 130, and core network 190. Wireless communication device 130 and wireless communication system 110 communicate over wireless link 131. Wireless communication system 110 and core network 190 communicate over link 191.

Wireless communication device 130 comprises a telephone, transceiver, computer, digital assistant, smart phone, Internet appliance, or some other wireless communication apparatus—including combinations thereof.

Wireless communication system 110 includes packet processing systems 111 and 112. Packet processing system 111 includes packet payload inspection system 113. Packet processing system 112 includes packet payload processing system 114. Wireless communication system 110 could also include wireless communications network equipment capable of communicating with wireless communication device 130. Further examples of wireless communication system 110 can include data centers, accounting and billing systems, base stations, base transceiver stations, boomer stations, antennas, radio node controllers (RNC), packet data serving nodes (PDSN), deep packet inspection (DPI) equipment, subscriber profile systems (SPS), authentication, authorization, and accounting (AAA) equipment, home agents, mobile switching centers, call processing equipment, wireless access nodes, wireless access points, telephone switches, Internet routers, network gateways, as well as other type of communication equipment—including combinations thereof. Although wireless communication system 110, as shown in FIG. 1, includes two packet processing systems, it should be understood that in other examples, more packet processing systems could be included in wireless communication system 110.

Packet payload inspection systems 113 and 114 include equipment for inspecting communication packets transferred between wireless communication device 130 and core network 190. Some examples of packet payload inspection systems 113 and 114 include deep packet inspection (DPI) equipment. Packet payload inspection systems 113 and 114 could also incorporate computer microprocessors, circuitry, or some other processing device or software system, and may be distributed among multiple processing devices. Packet payload inspection systems 113 and 114 may also include software such as an operating system, logs, utilities, drivers, networking software, and other software stored on a computer-readable medium.

Core network 190 could include a core network of a communication service provider, an Internet network, wireless network, telephony network, optical network, enterprise network, local area network, or some other type of communication network or communication equipment—including combinations thereof.

Wireless link 131 uses various communication media, such as air, space, or some other wireless transport media—including combinations thereof. Wireless link 131 could use protocols such as code division multiple access (CDMA), evolution-data optimized (EV-DO), worldwide interoperability for microwave access (WiMAX), long-term evolution (LTE), wireless fidelity (WiFi), global system for mobile communications (GSM), universal mobile telecommunications system (UMTS), or some other communication format—including combinations, variations, or improvements thereof.

Wireless link 131 may comprise many different signals sharing the same link. Wireless link 131 could include multiple signals operating in a single "airpath"—as represented by the dashed line in FIG. 1—comprising multiple frequencies, timeslots, time cycles, channels, directional links, transportation ports, logical transportation links, tunnels, network sockets, packets, or communication directions. For example, communications and control signals between wireless communication device 130 and wireless communication system 110 could share the same wireless link 131, but be transferred over different frequencies, timeslots, time cycles, channels, directional links, transportation ports, logical transportation links, tunnels, network sockets, packets, or in different directions—including combinations thereof.

Link 191 uses various communication media, such as air, space, metal, optical fiber, or some other signal propagation path—including combinations thereof. Link 191 could be wired or wireless and could use communication protocols such as Internet, Internet protocol (IP), local-area network (LAN), optical networking, hybrid fiber coax (HFC), telephony, T1, or some other communication format—including combinations, improvements, or variations thereof. Link 191 could be a direct link or might include various equipment, intermediate components, systems, and networks. Link 191 could include multiple signals operating in a single pathway in a similar manner as wireless link 131.

Figure 2:
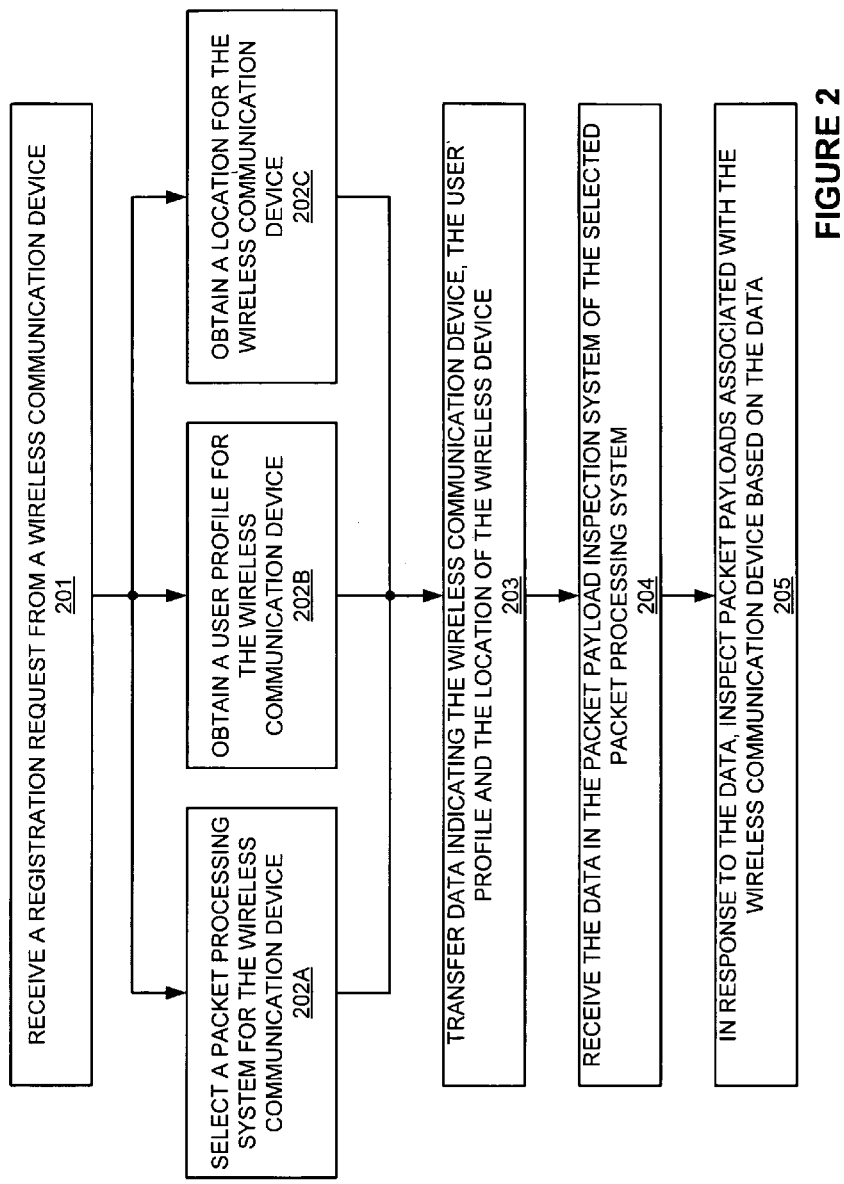
FIG. 2 is a flow diagram illustrating a method of operation of a communication system.

FIG. 2 is a flow diagram that illustrates a method of operation of communication system 100, as found in FIG. 1. The phases shown in FIG. 2 are indicated herein parenthetically. In FIG. 2, wireless communication system 110 receives (201) a registration request from wireless communication device 130. This registration request could include a request to initiate communications with wireless communication system 110, a request to register with an access node of wireless communication system 110, a request to initiate a communication session across wireless link 131, an identifier or indicator of wireless communication device 130, an application type of the communications, or other registration requests and information.

Wireless communication system 110 selects (202A) a packet processing system for wireless communication device 130. Packet processing system 111 or 112 could be selected, among other packet processing systems included in wireless communication system 110.

Wireless communication system 110 also obtains (202B) a user profile for wireless communication device 130. This user profile could include information related to a level of service for wireless communication device 130 or communications therewith, a service level agreement of wireless communication device 130, a quality-of-service (QoS) policy, an identifier of wireless communication device 130, or other user profile information.

Wireless communication system 110 also obtains (202C) a location for wireless communication device 130. This location could indicate a geographic location of wireless communication device 130, a base station at which receives a registration request from wireless communication device 130, a sector of the base station, or other locations.

Wireless communication system 110 then transfers (203) data indicating wireless communication device 130, the user profile for wireless communication device 130, and the location for wireless communication device 130 for delivery to one of the packet payload inspection systems included in the packet processing system as selected in phase 202A.

The one of the packet payload inspection systems included in the packet processing system as selected in phase 202A receives (203) the data, and in response to the data, inspects (205) packet payloads associated with the wireless communication device based on the data.

In further examples of communication system 100, communication packets are transferred between wireless communication device 130 and core network 190 through wireless communication system 110. Communication packets received in wireless communication system 110 can be transferred through the selected one of packet processing systems 111 or 113. The one of the packet payload inspection systems included in the packet processing system as selected in phase 202A inspects (205) packet payloads of the communication packets associated with the wireless communication device based on the data received in phase 204. The selected one of packet processing systems 111 or 113, for example, can then exchange communication packets with further systems and equipment in wireless communication system 110, wireless communication device 130 over wireless link 130, or with core network 190 over link 191.

Figure 3:
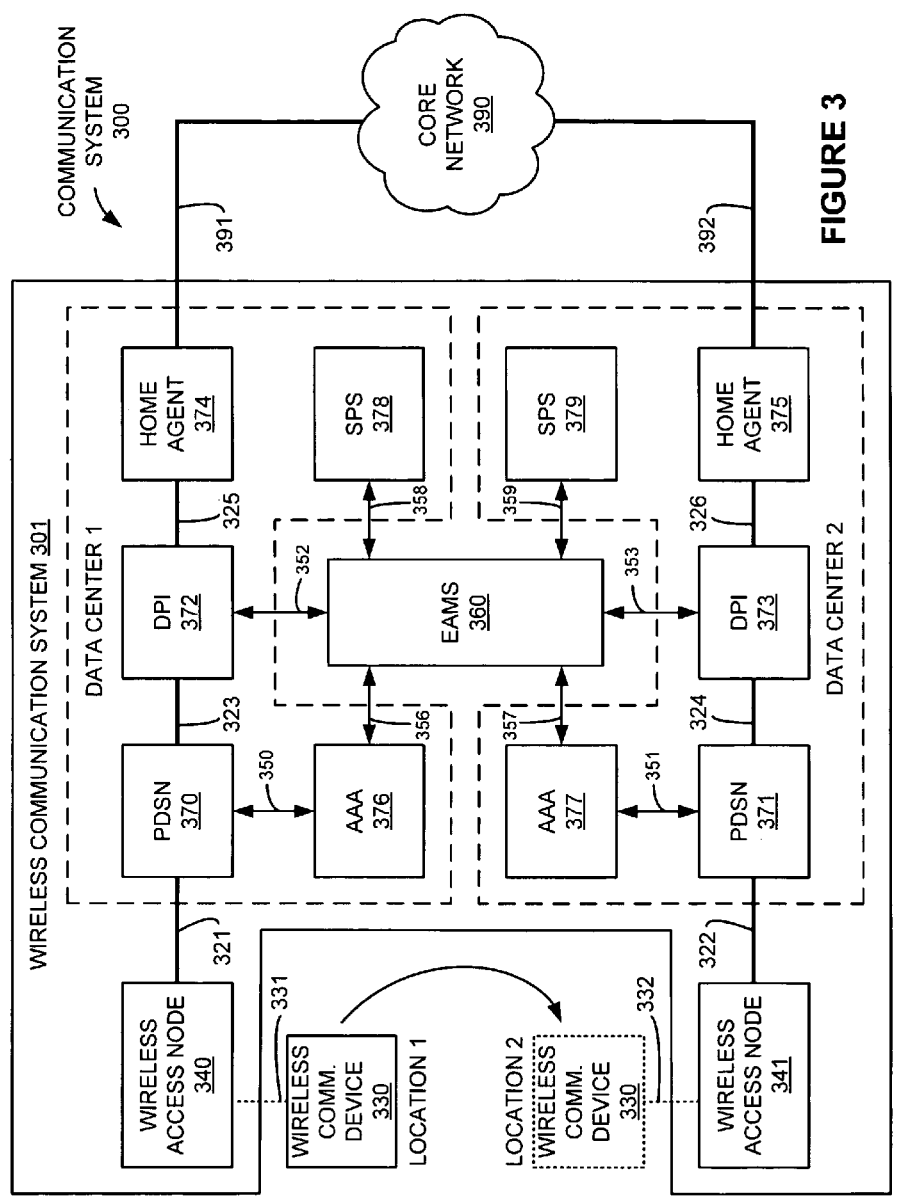
FIG. 3 is a system diagram illustrating a communication system.

FIG. 3 is a system diagram illustrating communication system 300. Communication system 300 includes wireless communication device 330, wireless communication system 301, and core network 390. Wireless communication system 301 includes wireless access nodes 340 and 341, enhanced accounting mediation system (EAMS) 360, and data centers 1 and 2. Data center 1, associated with location 1, includes packet data serving node (PDSN) 370, deep packet inspection (DPI) equipment 372, home agent 374, authentication, authorization, and accounting (AAA) equipment 376, and subscriber profile system (SPS) 378. Data center 2, similar to data center 1, but associated with location 2, includes PDSN 371, DPI 373, home agent 375, AAA 377, and SPS 379.

Wireless communication device 330 comprises a telephone, transceiver, computer, digital assistant, smart phone, Internet appliance, or some other wireless communication apparatus—including combinations thereof. As shown in FIG. 3, wireless communication device 330 could be located at either location 1 or location 2.

Wireless access nodes 340 and 341 include wireless communications network equipment capable of receiving registration requests and handling wireless communications with wireless communication device 330. Examples of wireless access nodes 340 and 341 can include base stations, base transceiver stations, boomer stations, antennas, access service network gateways (ASN-GW), radio node controllers (RNC), mobile switching controllers, call processing equipment, wireless access points, Internet routers, network gateways, systems as well as other type of communication equipment—including combinations thereof.

Enhanced accounting mediation system (EAMS) 360 includes equipment for generating and tracking accounting and billing information of wireless communication device 330. In this example, EAMS 360 includes equipment to accumulate various communication network statistics and parameters related to wireless communication device 330, such as registration information, usage detail records (UDR), user profiles, quality-of-service profiles, or other information related to wireless communication device 330. In other examples, EAMS 360 is an enhanced accounting mediation system. EAMS 360 could include remote authentication dial-in user service (RADIUS) interfaces or application programming interfaces (API) in some examples. EAMS 360 could also incorporate computer microprocessors, circuitry, or some other processing devices or software system, and may be distributed among multiple processing devices. EAMS 360 may also include software such as an operating system, logs, utilities, drivers, networking software, and other software stored on a computer-readable medium.

Packet data serving nodes (PDSN) 370 and 371 include equipment for routing communication packets between wireless communication system 301 and wireless access nodes 340 and 341 as associated with wireless communication device 330. PDSN 370 and 371 could comprise routers, gateways, network interfaces, pseudo wire interfaces, media converters, or other equipment.

Deep-packet inspection (DPI) equipment 372 and 373 include equipment for inspecting payloads of communication packets transferred between wireless communication device 330 and core network 390. DPI equipment 372 and 373 could also incorporate computer microprocessors, circuitry, or some other processing devices or software system, and may be distributed among multiple processing devices. DPI equipment 372 and 373 may also include software such as an operating system, logs, utilities, drivers, networking software, and other software stored on a computer-readable medium. In some examples, home agent 374 and DPI 372 are included in the same equipment, and likewise home agent 375 and DPI 373. In other examples, PDSN 370 and DPI 372 are included in the same equipment, and likewise PDSN 371 and DPI 373.

Home agents 374 and 375 include equipment for routing communication packets between wireless communication system 301 and core network 190. Home agents 374 and 375 could comprise routers, gateways, network interfaces, pseudo wire interfaces, media converters, or other equipment. In some examples, home agents 374 and 375 could include equipment to create a communication tunnel to wireless communication device 330 through the appropriate data center 1 or 2. For example, a virtual-private network (VPN) link, level 2 tunnel, or other communication tunnel could be formed between home agent 374 and wireless communication device 330 when wireless communication device is at location 1. Likewise, when wireless communication device is at location 2, a communication tunnel could be formed between home agent 375 and wireless communication device 330.

Authentication, authorization, and accounting (AAA) systems 376 and 377 include equipment for handling registration requests from communication device 330. AAA 376 and 377 include equipment for authenticating wireless communication device 330, for example, determining if wireless communication device is allowed to communicate with an associated data center. AAA 376 and 377 could also include equipment for authorizing wireless communication device 330 to access certain communication services, and accounting equipment to maintain a historical log of access and registration requests of wireless communication device 330. In some examples, AAA 376 and 377 incorporate computer microprocessors, circuitry, or some other processing devices or software system, and may be distributed among multiple processing devices. AAA 376 and 377 may also include software such as an operating system, logs, utilities, drivers, networking software, and other software stored on a computer-readable medium.

Subscriber profile systems (SPS) 378 and 379 include equipment for accessing a user profile such as a service level agreement or quality-of-service profile of wireless communication device 330. SPS 378 and 379 could determine a user profile based upon a quality-of-service assigned to a user of wireless communication device 330, an application type of the communication service requested by wireless communication device 330, a service level agreement, time of day, or other factors. SPS 378 and 379 could also create quality-of-service policies by determining a proper level of service desired for the communication packets transferred to/from wireless communication device 330. SPS 378 and 379 comprise computer systems or special purpose circuitry which may include storage systems, user interfaces, and network and data interfaces—including combinations thereof.

Core network 390 could include a core network of a communication service provider, an Internet network, wireless network, telephony network, optical network, enterprise network, local area network, or some other type of communication network or communication equipment—including combinations thereof.

Wireless communication device 330 and wireless access node 340 communicate over wireless link 331 when wireless communication device 330 is at location 1. Wireless access node 340 and PDSN 370 communicate over link 321. PDSN 370 and AAA 376 communicate over link 350. PDSN 370 and DPI 372 communicate over link 323. DPI 372 and EAMS 360 communicate over link 352. DPI 372 and home agent 374 communicate over link 325. SPS 378 and EAMS 360 communicate over link 358. Home agent 374 and core network 390 communicate over link 391. In some examples, links 321, 323, 325, and 391 form a pathway between wireless access node 340 and core network 390 for the exchange of communication packets originating from or destined to wireless communication device 330 over wireless link 331 when at location 1.

Wireless communication device 330 and wireless access node 341 communicate over wireless link 332 when wireless communication device 330 is at location 2. Wireless access node 341 and PDSN 371 communicate over link 322. PDSN 371 and AAA 377 communicate over link 351. PDSN 371 and DPI 373 communicate over link 324. DPI 374 and EAMS 360 communicate over link 353. DPI 373 and home agent 375 communicate over link 326. SPS 379 and EAMS 360 communicate over link 359. Home agent 375 and core network 390 communicate over link 392. In some examples, links 322, 324, 326, and 392 form a pathway between wireless access node 341 and core network 390 for the exchange of communication packets originating from or destined to wireless communication device 330 over wireless link 332 when at location 2.

Wireless links 331 and 332 use various communication media, such as air, space, or some other wireless transport media—including combinations thereof. Wireless links 331 and 332 could use protocols such as code division multiple access (CDMA), evolution-data optimized (EV-DO), worldwide interoperability for microwave access (WiMAX), long-term evolution (LTE), wireless fidelity (WiFi), global system for mobile communications (GSM), universal mobile telecommunications system (UMTS), or some other communication format—including combinations, variations, or improvements thereof.

Wireless links 331 and 332 may comprise many different signals sharing the same link. Wireless links 331 and 332 could include multiple signals operating in a single "airpath"—as represented by the dashed line in FIG. 3—comprising multiple frequencies, timeslots, time cycles, channels, directional links, transportation ports, logical transportation links, tunnels, network sockets, packets, or communication directions. For example, communications and control signals between wireless communication device 330 and wireless access nodes 340 and 341, depending upon the location of wireless communication device 330, could share the same wireless link, but be transferred over different frequencies, timeslots, time cycles, channels, directional links, transportation ports, logical transportation links, tunnels, network sockets, packets, or in different directions—including combinations thereof.

Links 321-327, 350-359, and 391-392 use various communication media, such as air, space, metal, optical fiber, or some other signal propagation path—including combinations thereof. Links 321-327, 350-359, and 391-392 could be wired or wireless and could use communication protocols such as Internet, Internet protocol (IP), local-area network (LAN), optical networking, hybrid fiber coax (HFC), telephony, T1, or some other communication format—including combinations, improvements, or variations thereof. Links 321-327, 350-359, and 391-392 could be direct links or might include various equipment, intermediate components, systems, and networks. Links 321-327, 350-359, and 391-392 could include multiple signals operating in a single pathway in a similar manner as wireless links 331 and 332.

Figure 4:
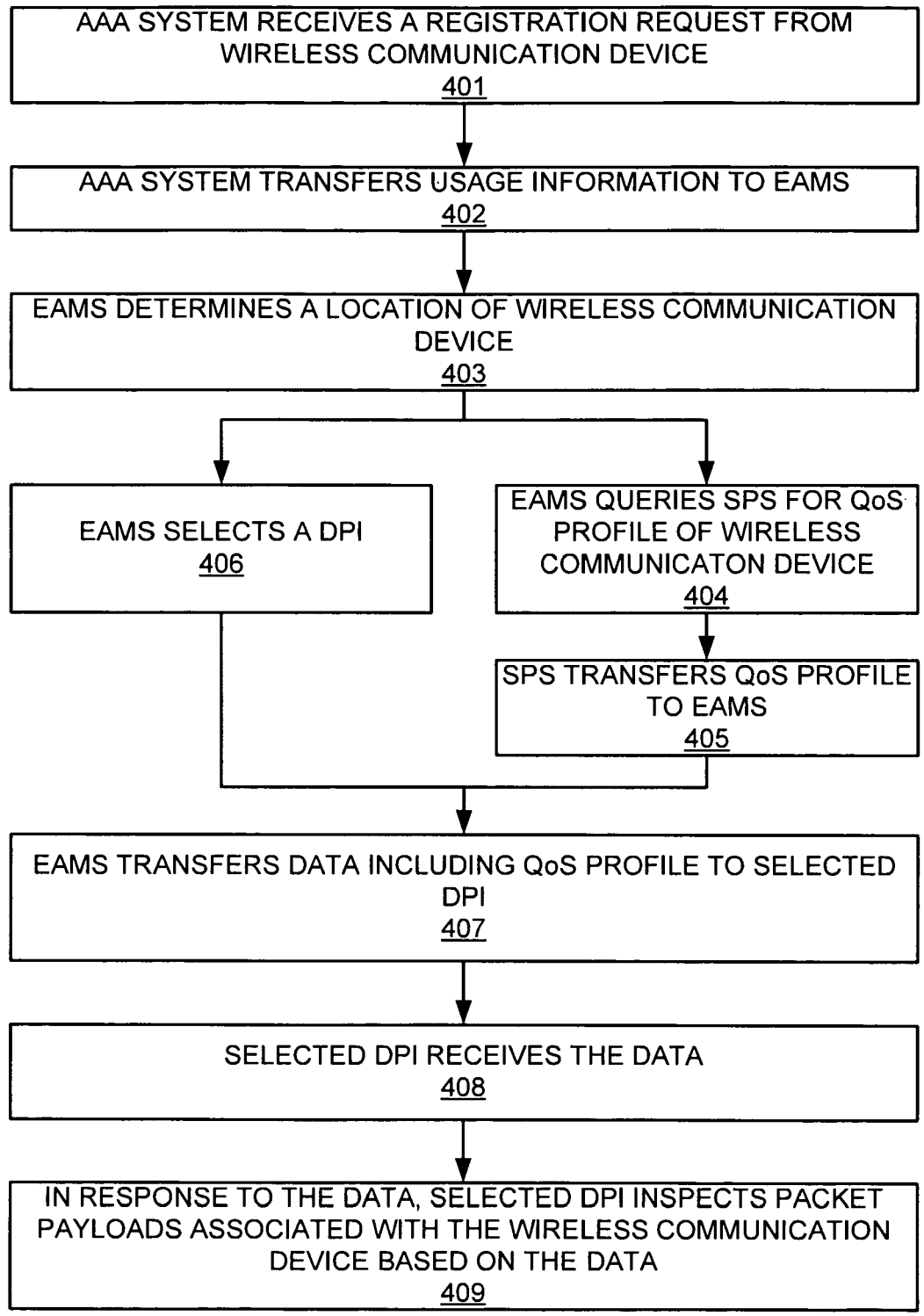
FIG. 4 is a flow diagram illustrating a method of operation of a communication system.

FIG. 4 is a flow diagram that illustrates a method of operation of communication system 300, as found in FIG. 3. The phases shown in FIG. 4 are indicated herein parenthetically. In the example shown in FIG. 3, wireless communication device 330 is initially located at location 1. While at location 1, wireless communication device transfers a registration request for communication service with wireless communication system 301. AAA 376 receives (401) the registration request from wireless communication device 330. In some examples, wireless access node 340 receives this registration request over wireless link 331 and passes the request to PDSN 370 over link 321, which further passes the request on to AAA 376 over link 350.

The registration request, in this example, includes a request from wireless communication device 330 to initiate communication service with core network 390 through access node 340 and likewise data center 1. The registration request could also include, in some examples, the wireless protocol overhead processing and initiation parameters transferred between wireless communication device 330 and wireless access node 340 over link 331, which may further include a wireless ranging process and wireless protocol handshaking, among other communication protocol overhead and registration procedures.

AAA 376 transfers (402) usage information to EAMS 360 over link 356. This usage information, in typical examples, includes information related to the registration request from wireless communication device 330, such as an identifier of wireless communication device 330, a time and date of the registration request, a requested application type of the communication service, a user of wireless communication device 330, a usage detail record (UDR), a base station identifier, a DPI assignment, or other information.

EAMS 360 determines (403) a location of wireless communication device 330. In this example, EAMS 360 processes the usage information received from AAA 376 to determine the location of wireless communication device 330. The determined location could indicate wireless access node 340 through which wireless communication device 330 transferred the registration request, or could include a sector of wireless access node 340, among other location information. The sector can represent a particular region of wireless coverage, typically served by a single antenna, antenna tower, or base transceiver station. Examples of a sector of a wireless access node include a portion or slice of the total wireless coverage region of a wireless access node. In many examples, multiple sectors are associated with a particular wireless access node. In some examples, the location could be received from AAA 376 in the form of a base station identifier, sector identifier, or other location information. In further examples, EAMS 360 parses the incoming AAA usage information, which could comprise usage detail records (UDR), to identify where wireless communication device 330 has presently attached to, or is located within, communication system 300.

EAMS 360 queries (404) SPS 378 for an appropriate user profile for wireless communication device 330. In many examples, EAMS 360 must first determine a SPS to query prior to initiating the query. As shown in FIG. 3, wireless communication system 301 includes SPS 378 and SPS 379. In this example, since wireless communication device would be located at location 1, SPS 378 would be selected. This query could include information included in the usage information received by EAMS 360 from AAA 376, among other information.

SPS 378 determines and transfers (405) the appropriate user profile to EAMS 360. The user profile transferred could be based on many factors. These factors could include the user of wireless communication device 330, the location of wireless communication device 330, a time of day or date of the request for communication service from wireless communication device 330, an application type of the communication service requested, or an indicator of wireless communication device 330, among other factors.

An application type comprises a user service or user communications as implemented in communication packets exchanged between wireless communication device 330 and wireless communication system 301. The user services, for example, could include Internet communications, voice calls, telephony, video, audio, email, text, chat data, web pages, peer-to-peer (P2P) communications, Voice over IP (VoIP), as well as other data and application types—including combinations thereof. The application could also be distinguished among different service providers, even though such service providers are providing similar types of user services. For example, although Voice over IP (VoIP) is a type of user service, various service providers, could also be distinguished from each other, much like the individual user services.

The user profile could also reflect a level of service, or quality-of-service (QoS), given to communication packets associated with wireless communication device 330 through wireless communication system 301 could be based upon data rate allowances, data type priority (for example, voice versus data), service level agreements, or other factors—including combinations thereof. A particular level of service could be associated with communication packets to and from wireless communication device 330. Also, the level of service could vary based upon application type. For example, streaming video could receive a lower level of service than voice calls, and e-mail could receive a lower level of service than streaming video. Additionally, a QoS profile could be determined for each application type contained within the communication packets of wireless communication device 330. In some cases, no distinction is made between the wireless device and the user of the wireless device, whereas in other cases, a distinction could be made.

EAMS 360 selects (406) a DPI to handle communication packets transferred to and from wireless communication device 330 through wireless communication system 301. This selection could be based upon the location of wireless communication device 330 or a preferred DPI for wireless communication device 330, among other factors. In this example, when wireless communication device 330 is at location 1, EAMS 360 would select DPI 372. In some examples, a proper DPI selection is received from AAA 376 in addition to possibly a home agent selection.

In this example, as discussed above, EAMS 360 accumulates diverse data from multiple sources used in operation of the selected DPI 372. EAMS 360 then transfers (407) the data, including the user profile, to the selected DPI 372 over link 352. This data could be a specialized portion of the usage information received from AAA 376 and SPS 378 tailored to suit the requirements of DPI 372. In some examples, EAMS 360 pushes the data to DPI 372, without a request from DPI 372, while, in other examples, DPI 372 requests the data first.

The selected DPI 372 then receives (408) the data, which includes the user profile. In response to the data, DPI 372 inspects (409) communication packet payloads associated with wireless communication device 330 based on the data. In some examples, the communication packets originate in core network 390 over link 391 and are subsequently routed by home agent 374 to DPI 372 over link 325. In other examples, the communication packets originate in wireless communication device 330 over wireless link 331 and are subsequently routed by wireless access node 340 over link 321 and PDSN 370 over link 323 to DPI 372.

DPI 372 can use packet payload inspection, in many examples, to determine a communication service implemented in the communication packet payloads. This communication service could be an application type, a certain variety or content of user communications, a particular service provider associated with the communication packet payloads, among other communication services.

DPI 372 can take action, facilitated by communication packet payload inspection, to monitor the application activity and other communication packets exchanged between wireless communication device 330 and core network 390, or other systems.

In further examples, DPI 372 could enforce a QoS profile by allowing or inhibiting communication packets in transit between core network 390 and wireless communication device 330. The adjustments that DPI 372 may make will vary on the desired results. For example, if communication traffic is composed primarily of video downloads and is limiting the available bandwidth for voice calls, then DPI 372 may decrease the level of service to communication packets containing video applications while maintaining a constant—or increasing—level of service for communication packets containing voice calls. In many examples, this action may be taken in an effort to bring activity level of a sector of a wireless access node in wireless communication system 301 back into desired bandwidth limits or service level agreements. In some examples, DPI 372 may inhibit transmission of the packet payloads based on the user profile and the communication service, such as an application type. In other examples, the location of wireless communication device 330 could be taken into account by DPI 372.

In yet other examples, DPI 372 could insert advertising in the packet payloads based upon the communication service implemented by the packet payloads, the user profile, the location of wireless communication device 330, among other factors. This advertising could be tailored to suit the various conditions or communications of wireless communication device 330, and inserted in the packet payloads while in transit through wireless communication system 301, advantageously allowing for specialized and directed advertising content.

The previous discussion regarding FIG. 4 assumes an initial location of wireless communication device 330 at location 1. In further examples, wireless communication device 330 could initially be located at location 2, or could transit from location 1 to location 2. The above discussed methods and phases would apply in a similar manner while wireless communication device 330 was either at location 1 or location 2. When wireless communication device 330 was at location 2, data center 2 would be involved in the registration request and subsequent interaction with wireless communication system 301, as described herein regarding FIG. 4, instead of data center 1.

Advantageously, wireless communication device 330 could receive similar treatment regarding user profiles, QoS, service level agreements, and deep packet inspection techniques across a multitude of locations and through different data centers of communication system 300. In such examples, the user profile other data associated with wireless communication device 330 would be selected and accumulated in a single system, such as EAMS 360, from among a multitude of registration and profile systems, such as AAA systems and SPS equipment located throughout wireless communication system 301, and transferred to the appropriate communication packet payload inspection equipment, such as a selected DPI system, regardless of the location of wireless communication device 330 or associated wireless access node in wireless communication system 301.

FIGS. 1-4 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless communication system that includes a plurality of packet payload inspection systems, the method comprising:

in the wireless communication system, receiving a registration request from a wireless communication device, and in response, selecting one of the packet payload inspection systems for the wireless communication device based on a location of the wireless communication device and transferring Quality-of-Service data for the wireless communication device to the selected packet payload inspection system, wherein the QoS data indicates QoS levels for a plurality of communication applications that are distinguished from one another by service type and service provider; and in the selected packet payload inspection system, receiving the QoS data for the wireless communication device, receiving communication packets for the wireless communication device, inspecting payloads of the communication packets to identify one of the communication applications by the service type and the service provider, selecting one of the QoS levels for communication packets based on the received QoS data and the identified communication application, and applying the selected QoS level to the communication packets.

2. The method of claim 1 further comprising, in the selected packet payload inspection system, selecting advertising for the communication packets based on the identified communication application as distinguished by the service type and the service provider and inserting the advertising into the communication packets.

3. The method of claim 1 wherein the identified communication application comprises a Voice over Internet Protocol (VoIP) service from a specific service provider.

4. The method of claim 1 wherein the identified communication application comprises a peer-to-peer communication service from a specific service provider.

5. The method of claim 1 wherein the identified communication application comprises an e-mail service from a specific service provider.

6. A wireless communication system comprising:

a mediation system comprising circuitry and configured to select one of a plurality of packet payload inspection systems for the wireless communication device based on a location of the wireless communication device and transfer Quality-of-Service data for the wireless communication device to the selected packet payload inspection system, wherein the QoS data indicates QoS levels for a plurality of communication applications that are distinguished from one another by service type and service provider; and the selected packet payload inspection system comprising circuitry and configured to receive the QoS data for the wireless communication device, receive communication packets for delivery to the wireless communication device, inspect payloads of the communication packets to identify one of the communication applications by the service type and the service provider, select one of the QoS levels for communication packets based on the received QoS data and the identified communication application, and apply the selected QoS level to the communication packets.

7. The wireless communication system of claim 6 wherein the selected packet payload inspection system is configured to select advertising for the communication packets based on the identified communication application as distinguished by the service type and the service provider and insert the advertising into the communication packets.

8. The wireless communication system of claim 6 wherein the identified communication application comprises a Voice over Internet Protocol (VoIP) service from a specific service provider.

9. The wireless communication system of claim 6 wherein the identified communication application comprises a peer-to-peer communication service from a specific service provider.

10. The wireless communication system of claim 6 wherein the identified communication application comprises an e-mail service from a specific service provider.

* * * * *